United States Patent

[11] 3,600,599

[72] Inventors Warren H. Wright
Palos Verdes;
John J. Biess, Canoga Park, both of, Calif.
[21] Appl. No. 764,823
[22] Filed Oct. 3, 1968
[45] Patented Aug. 17, 1971
[73] Assignee TRW Inc.
Redondo Beach, Calif.

[54] SHUNT REGULATION ELECTRIC POWER SYSTEM
2 Claims, 11 Drawing Figs.

[52] U.S. Cl. .......... 307/53, 307/69, 320/53, 323/19
[51] Int. Cl. .......... H02j 1/10, H02j 3/38, H02j 7/34
[50] Field of Search .......... 323/15, 21, 19; 320/2, 29, 35, 39; 250/212, 214, 220; 307/66, 53, 69

[56] References Cited

UNITED STATES PATENTS

| | | | |
|---|---|---|---|
| 3,480,789 | 11/1969 | Binckley et al. | 323/19 X |
| 3,127,552 | 3/1964 | Stead | 320/2 |
| 3,350,618 | 10/1967 | Barney et al. | 320/35 X |
| 3,387,199 | 6/1968 | Billerbeck, Jr. et al. | 320/35 X |
| 3,419,779 | 12/1968 | Zehner | 307/66 X |

OTHER REFERENCES

RCA Technical Notes TN NO:783, Sept. 25, 1968 " Shunt Type Voltage Regulator" by Paul S. Nekrasov; 4 sheets (copy in 323-15)

*Primary Examiner*—J. D. Miller
*Assistant Examiner*—Gerald Goldberg
*Attorneys*—Daniel T. Anderson, Alfons Valukonis and Harry I. Jacobs

ABSTRACT: A regulated electric power system having load and return bus lines. A plurality of solar cells interconnected in power supplying relationship and having a power shunt tap point electrically spaced from the bus lines is provided. A power dissipator is connected to the shunt tap point and provides for a controllable dissipation of excess energy supplied by the solar cells. A dissipation driver is coupled to the power dissipator and controls its conductance and dissipation and is also connected to the solar cells in a power taping relationship to derive operating power therefrom. An error signal generator is coupled to the load bus and to a reference signal generator to provide an error output signal which is representative of the difference between the electric parameters existing at the load bus and the reference signal generator. An error amplifier is coupled to the error signal generator and the dissipation driver to provide the driver with controlling signals.

Warren H. Wright
John J. Biess
INVENTORS

BY Daniel T. Anderson

ATTORNEY

Warren H. Wright
John J. Biess
*INVENTORS*

BY
Daniel T. Anderson
ATTORNEY

Warren H. Wright
John J. Biess
INVENTORS

BY
Daniel T. Anderson
ATTORNEY

Warren H. Wright
John J. Biess
INVENTORS

BY Daniel T. Anderson
ATTORNEY

SHUNT REGULATION ELECTRIC POWER SYSTEM

BACKGROUND OF THE INVENTION

1. FIELD OF THE INVENTION

This invention relates generally to electric power supply systems and more particularly to electrical regulation thereof vis-a-vis effectively nonconstant source elements and/or varying conditions of energy storage and load utilization.

Although the invention finds particularly advantageous application in the field of multielement arrays of solar cell power supplies coupled to storage batteries for powering equipment and instrumentation remote from conventional power sources e.g. space satellite applications, and although in the cause of brevity and clarity of presentation much of the following discussion and description of examples of the invention relate particularly thereto, it is expressly to be understood that the advantages of the invention are equally well manifest in other fields of electric energy supply such as, for example, the utilization of thermoelectrics, fuel cells, and the like where load conditions and source output capacity may widely vary as in a cyclic or lifetime degrade manner.

2. DISCUSSION OF THE PRIOR ART

With particular reference, therefore, to photovoltaic power sources, and their regulation as in large area, multicell solar array-storage battery systems, it has long been recognized that such systems present a particularly severe problem of supply parameter regulation. These systems typically comprise a very large number of very low output photocells which are interconnected in a matrix network to provide predetermined output voltage and current magnitudes constituting a desired useful supply of power. The problems of providing predetermined and usefully regulated output parameters are increased by extreme temperature variation and nonconstant incidence of solar radiation on the individual transducer elements; that is, the angle of incidence and magnitude of intensity of the radiation typically vary over very great ranges due to (1 ) vehicle orientation causing structure eclipse and (2 ) orbit location causing terrestrial eclipse. Furthermore, the individual cells have a finite normal lifetime and suffer, on a system basis, a relatively high probability of failure of individual ones of the cells. In addition, the load or utilization parameters typically vary over very great ranges. Finally, all these problems are intensely aggravated by the requirement for maximum system lifetime without possibility, because of the extreme remoteness, of repair, rebuilding, or replacement of any system components.

Prior art approaches to the problems enumerated have typically been directed toward providing series regulator apparatus connected in series between the source panel and its utilization load: The regulation is achieved by blocking and dissipating excess power from the array whereby a predetermined load bus voltage or current is maintained. The disadvantages of such series dissipative regulators result from the design of the regulator to conduct the full load current which mandates a large dissipative capability particularly, for example, during posteclipse portions of the cycle when the storage batteries are typically demanding maximum charge current and the array, although illuminated, is still cold. In addition, the series arrangement generally requires considerable drive power and causes appreciable loss of array power when no dissipation is required or desired as during periods of partial eclipse or at the times approaching system end of life. These difficulties of series regulation can be obviated by complex bypassing and switching circuitry or by adding compensating additional transducer cells to the array. Either solution, however, constitutes a cost disadvantage in adding weight and complexity and adds to system failure probability.

Prior art shunt regulation techniques have heretofore typically been directed toward providing apparatus which achieves dissipation of excess array power in a substantially brute-force manner. Again, unless complex circuitry is utilized, the minimum standby power for control and drive of the shunt dissipator apparatus requires additional source elements in the transducer matrix. Further, the large amounts of maximum power to be dissipated in such systems places a considerable life-shortening stress on the control and dissipative elements and creates significant problems of removing heat from the electrically dissipative elements.

Other attempts in the prior art have been directed toward the utilization of high frequency switching techniques whereby the source power is coupled to the load in a cyclically actuated time gated manner. These techniques, as thus far disclosed in the art, have resulted in complex, less than acceptably reliable, large, massive, and costly structure which, in addition, requires costly and heavy filtering devices and which has proven difficult with which to incorporate redundancy for satisfactory reliability configurations.

Accordingly, it is an object of the present invention to provide a novel electric power regulation system which is not subject to these and other disadvantages and limitations of the prior art.

It is another object to provide such apparatus which does not require that the regulator carry the load current.

It is another object to provide such apparatus which dissipates power substantially only when excess, undesired power is being generated.

It is another object to provide such a system which is relatively simple and electrically rugged with high inherent reliability.

It is another object to provide such apparatus which requires control power of sufficiently small magnitudes as to permit a smaller, lighter, less costly, and more reliable power source.

It is another object to provide such a system which exhibits a very fast and accurate response to regulation needs.

It is another object to provide such apparatus which neither causes ripple in the load power nor requires the incorporation of filtering devices therewith.

It is another object to provide improved shunt regulation apparatus which is capable of controlling large amounts of power while requiring the dissipation of only small fractions thereof and which may thereby greatly reduce the thermal stresses in the dissipation system.

It is another object to provide such a system which for a given load requirement requires a smaller number of photocell transducers and which utilizes, for standby control power, only approximately 1 percent of the end of life capability of the array matrix.

SUMMARY OF THE INVENTION

Very briefly, these and other objects are achieved in a solar cell array example of the invention which includes a shunt regulator dissipation system tapped across a portion only of the array of photocells. A driver circuit which controls the dissipation achieved is supplied similarly from a tap point of the array. An error signal generator receives input signals from the load bus and from a reference and supplies the error signal through appropriate amplification circuitry to the driver.

All of the circuitry after the error signal generator may be biased off whereby there is substantially zero drain from either the load bus or the array unless there is an excess of power, which desirably, is to be dissipated.

The combination of this example includes novel redundancy reliability configurations in the power dissipation components and minor loop feedback stabilization configurations in the low-power control network portions.

Further details of these and other novel features and their principles of operation as well as additional objects and advantages of the invention will become apparent and be best understood from a consideration of the following description when taken in connection with the accompanying drawings which are all presented by way of illustrative example only.

DESCRIPTION OF PREFERRED EMBODIMENTS

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawings will make it apparent to those skilled in the electric power supply and electronic controls arts how the several forms of the invention may be embodied in practice.

Specifically, the detailed showing is not to be taken as a limitation upon the scope of the invention which is defined by the appended claims forming, along with the drawings, a part of this specification.

Figure 1:
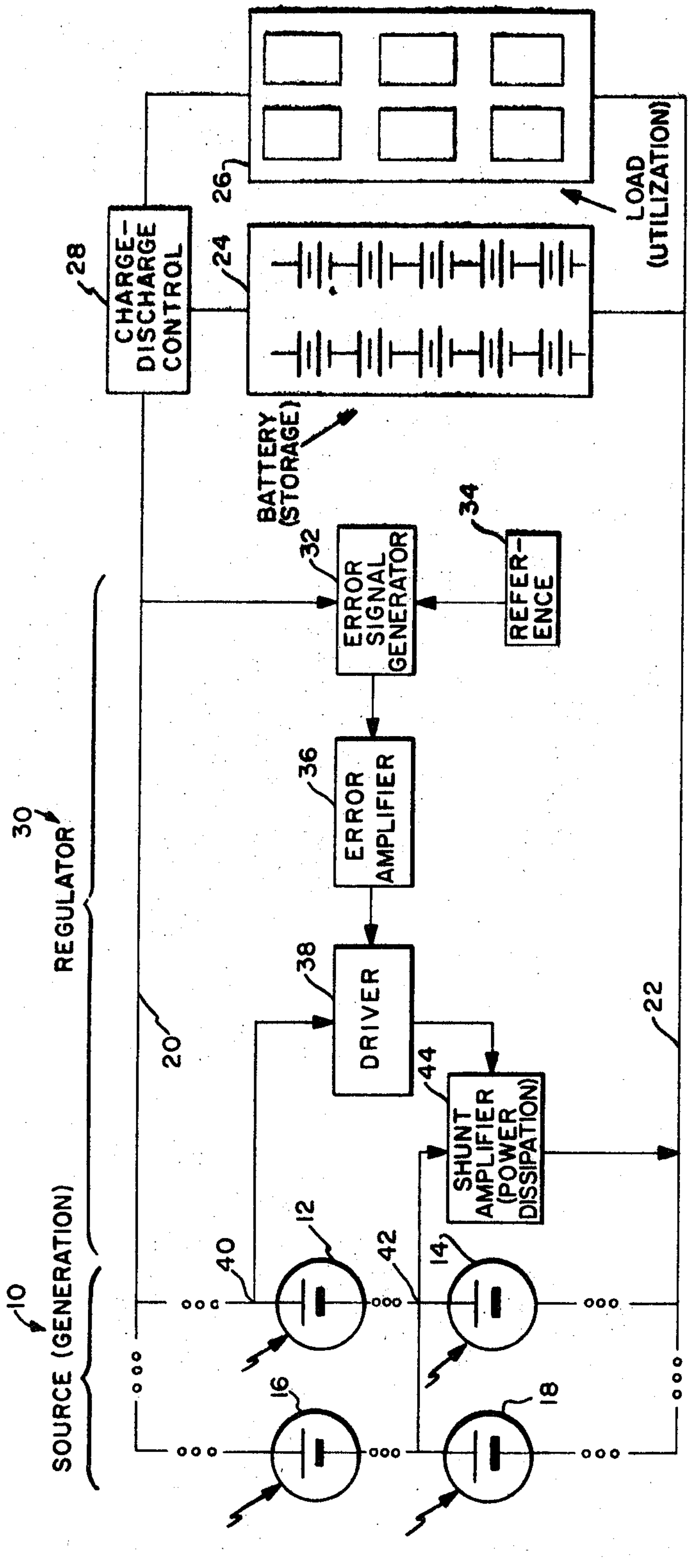
FIG. 1 is an overall block diagram view of an example of an electric power regulation system constructed in accordance with the principles of the present invention.

In the example of FIG. 1 a solar array power supply system is illustrated which includes a network 10 of source elements 12, 14, 16, 18. The elements in this example are individual photovoltaic cells arranged in a matrix configuration including at least one string of series connected elements connected between load and return buses 20, 22, respectively. The figure is generalized to indicate that different numbers of strings and strings of different element quantities may be utilized.

A storage battery 24 and a load circuit 26 are shown coupled to the source buses by means of a charge-discharge control network 28 which, by substantially conventional techniques, channels electrical power into the battery from the solar cell array for charging, out of the battery and to the load, or directly from the source to the load depending upon the instantaneous load requirements, the state of charge of the battery, and the output available from the solar cell array.

Interposed between the array 10 and the utilization components 24, 26, 28 is a shunt regulator system 30. In this example, an error signal generator 32 compares an electrical parameter associated with the load bus 20 with a parameter value reference or standard 34 and generates an error signal representative of their difference. In the example illustrated, the control parameter is the load bus voltage; however, clearly, other parameters such as load bus current, battery current, output power, or the like may, as desired, be utilized as the quantity to be monitored and controlled.

The error signal output from the generator circuit 32 is impressed upon an error signal amplifier 36 which, in turn, supplies a control signal for a driver amplifier 38. The driver draws operating power from the array 10 at a source tap 40 which is electrically interposed between a shunt power tap 42 and the load bus 20. It may be noted that in accordance with the present invention, the driver power tap may be electrically any selected array point between and including the shunt power tap 42 and a point significantly different from the bus 20; the criteria for such selection being discussed infra.

A shunt power dissipation amplifier 44 driven by the error signal controlled driver 38 is intercoupled between the shunt power tap 42 and the return bus 22 in a manner to reduce the array output, in accordance with its overall current voltage characteristic, thereby to control the monitored power source parameter.

Figure 2B:
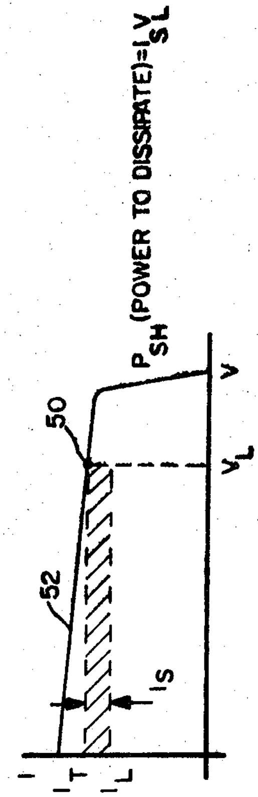
Fig.2B PRIOR ART
FIG. 2B is a graph plotting array current on the ordinate as a function of array voltage on the abscissa for the prior art structure of FIG. 2A.
Figure 2A:
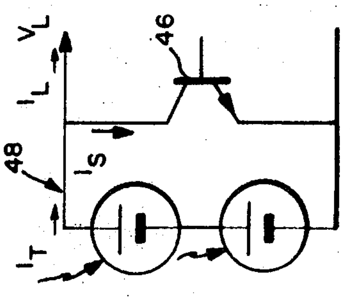
FIG. 2A is a schematic diagram of a portion of an analogous system as provided according to a typical prior art approach.

Referring to FIG. 2A, a prior art shunt regulator is indicated and includes a power transistor 46 coupled in shunt across the entire array 48. The total array current is designated $I_T$, the load bus current and voltage as $I_L$, $V_L$, respectively, and the shunted, dissipated, current as $I_S$.

The output characteristic is displayed in FIG. 2B wherein $I_T$ is plotted as a function of the array voltage. Assuming a desired load current $I_L$ and a desired load voltage $V_L$, and the array being operated at the point 50 on the array characteristic curve 52, it may be seen that the difference, $I_S$, between $I_T$ and $I_L$ is the current to be shunted thereby to dissipate the power $I_S$ which is shown by the shaded area on the graph and must be dissipated by the transistor 46. The power to be delivered to the load is the larger, unshaded, rectangular area below the shaded rectangle.

Figure 3A:
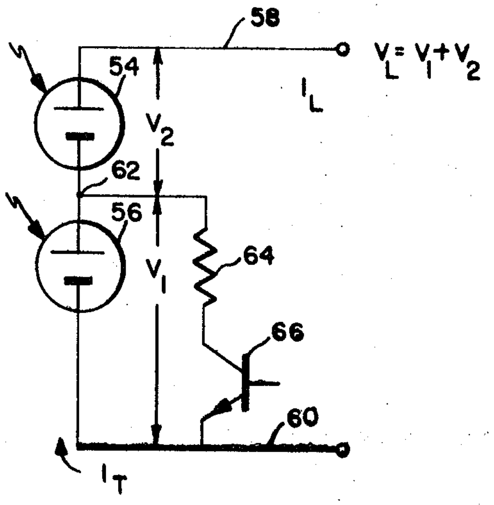
FIG. 3A is a schematic diagram of a portion of a simplified example of the structure of FIG. 1.

In FIG. 3A a portion of an example of the high efficiency shunt regulator of the present invention is illustrated and includes a series string of photovoltaic transducers 54, 56 connected between a load bus 58 and a return 60. The dissipative shunt circuit is shown connected between a shunt power tap point 62 and the return bus. The shunt circuit comprises a passive dissipative portion indicated by the resistor 64 and a power transistor 66. The total array voltage is $V_T$ and is the sum of the tap-to-bus voltages $V_1$, $V_2$. $I_L$ is load bus current and $I_T$ is the effective shunt loop current.

Figure 3B:
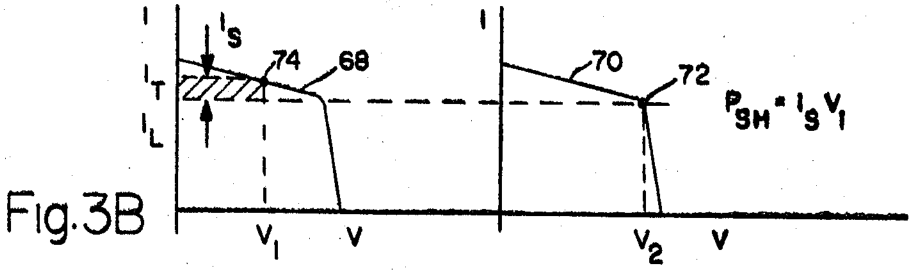
FIG. 3B is a pair of graphs, each similar to that of FIG. 2B, relating to the operation of the structure of FIG. 3A.

Referring to FIG. 3B, the total or overall array characteristic is shown resolved into two component characteristics each related to a respective set $V_1I_T$ and $V_2I_L$ as illustrated by the curves 68, 70 respectively. (It should be noted that the curves 52, 68, and 70 are drawn to approximately the same scale).

Assuming again that $I_L$ is the desired output current and $V_L$ is the desired output voltage, the upper element 54 may be operated at the point 72 on the curve 70 thus providing a voltage $V_2$. The element 56 in order to operate at the desired voltage $V_1$ is then controlled to operate at the point 74 on the characteristic 68. Operation at the point 74, however, is seen to require shunting of the current $I_S$, being again the difference between $I_t$ and $I_L$ as they relate to the curve 68. The consequent dissipation, however, is only of the power represented by the area $I_SV_1$ on the curve 68. In this particular illustration, the power to be dissipated is due to the composite characteristic of the elements 54, 56, and is of the order of half that for the prior art full shunt case. The dissipation in the amplifier element 66 is further reduced by the passive dissipator resistor 64. Thusly the current and thermal stresses on the dissipative components is greatly reduced resulting in their increased lifetimes and permitting the design deletion of much thermal energy transfer apparatus for removing heat from the dissipative elements.

Figure 4:
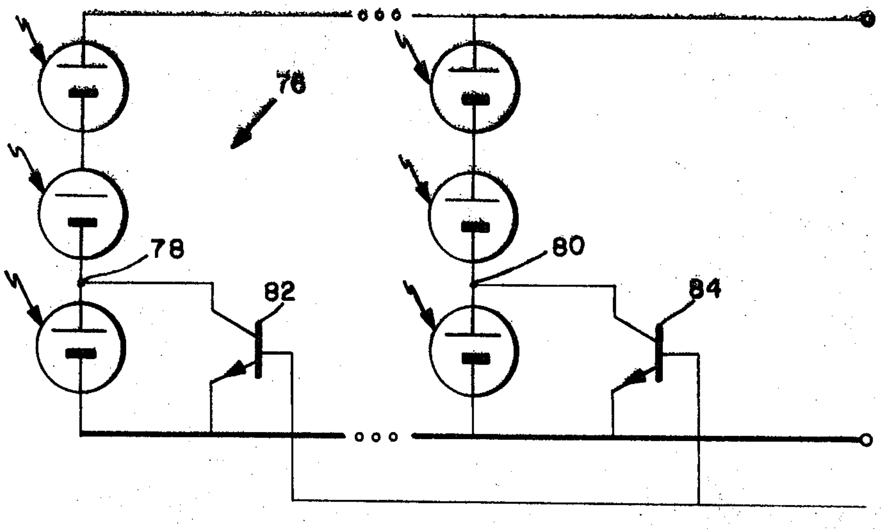
FIG. 4 is a schematic diagram of a detail portion of an example of the structure of FIG. 1.
Figure 5:
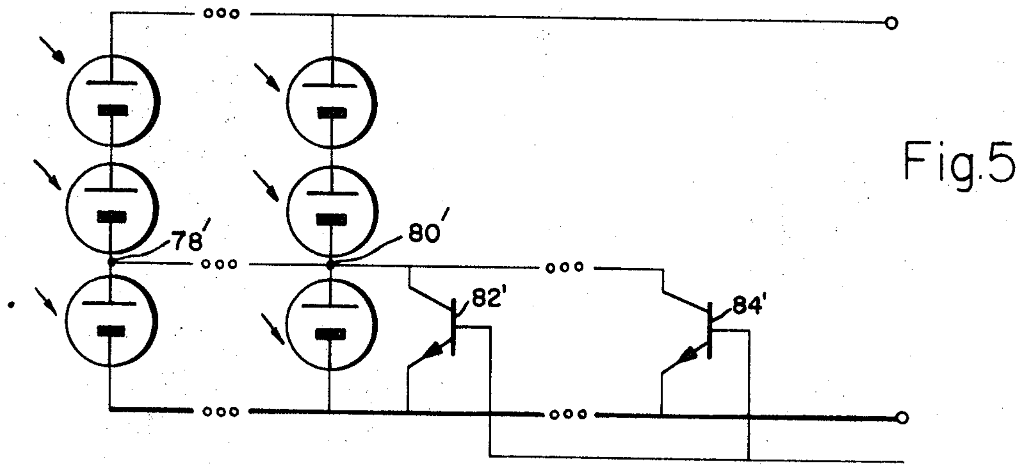
FIG. 5 is a schematic diagram of structure alternative to that of FIG. 4.

In FIG. 4 an array 76 of photovoltaic transducer elements is illustrated in which a number of electrically similar shunt tap power points 78, 80 are shown to each of which is connected a controlled dissipative shunt element 82, 84, respectively. In FIG. 5, the tap points 78′, 80′ are shown electrically connected and with the dissipative elements 82′, 84′ connected directly in parallel. Again passive dissipative elements may be incorporated to increase further the system reliability and decrease the active element thermal stresses.

Figure 6:
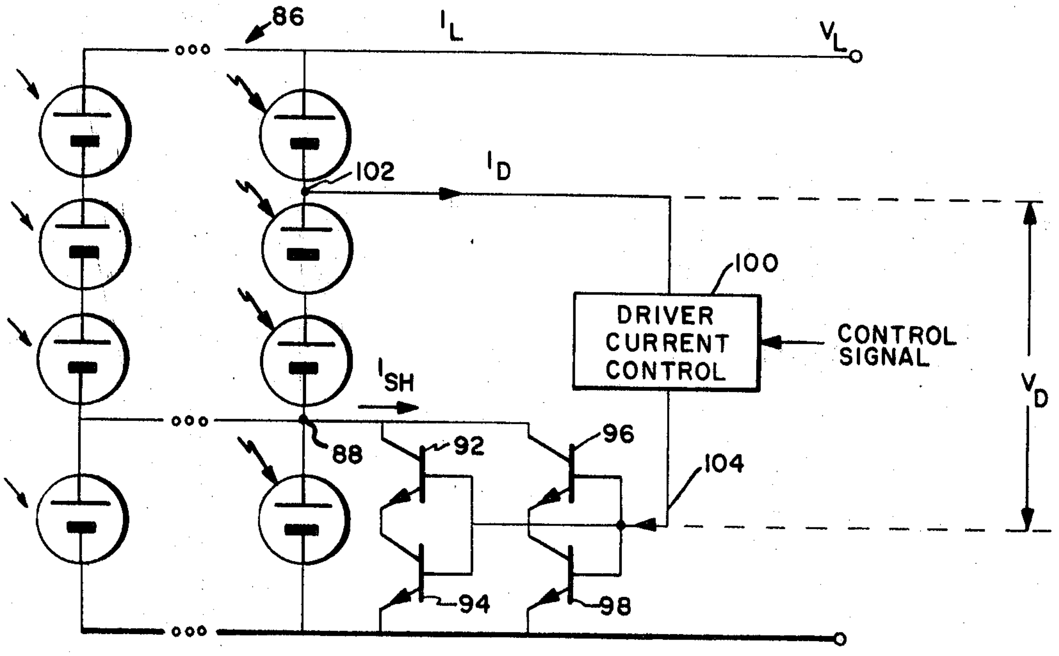
FIG. 6 is a schematic diagram of a detail portion of an example of the structure of FIG. 1.

Referring to FIG. 6, a further example of increased dissipation capacity and reliability is illustrated. An array 86 is shown having a power shunt tap at the point 88 to which is coupled a series quad amplifier arrangement 90 of power transistors 92, 94, 96, 98. The quad configuration is common-base driven from a driver current control circuit 100 controlled in turn by a signal from the error amplifier, not shown, and deriving its operating power from the array at the reduced voltage (with respect to the load bus voltage) point 102. During normal mode operation, the dissipation of the energy associated with $I_{SH}$ drawn from the tap 88, is equally shared by the two quad-amplifier transistors 92, 96. When, however, any one of the transistors fails in either open or shorted mode, the amplifier continues to operate.

The example of FIG. 6 further illustrates the reduced minimum power drain and dissipation of the driver circuit from the source array 86. Assuming that a given driver current $I_D$ is required at the base bus 104, the power dissipated by the driver 100 is, to at least a good approximation, the product $I_D V_D$ where $V_D$ is the voltage across the driver circuit as indicated. Conventionally $I_D$ is drawn from the load bus thusly maximizing the power drawn by the driver. In accordance with the present invention the power for the driver being taken from a reduced voltage point 102 significantly reduces the maximum power drain caused by the driver apparatus.

Figures 7, 8, 9:
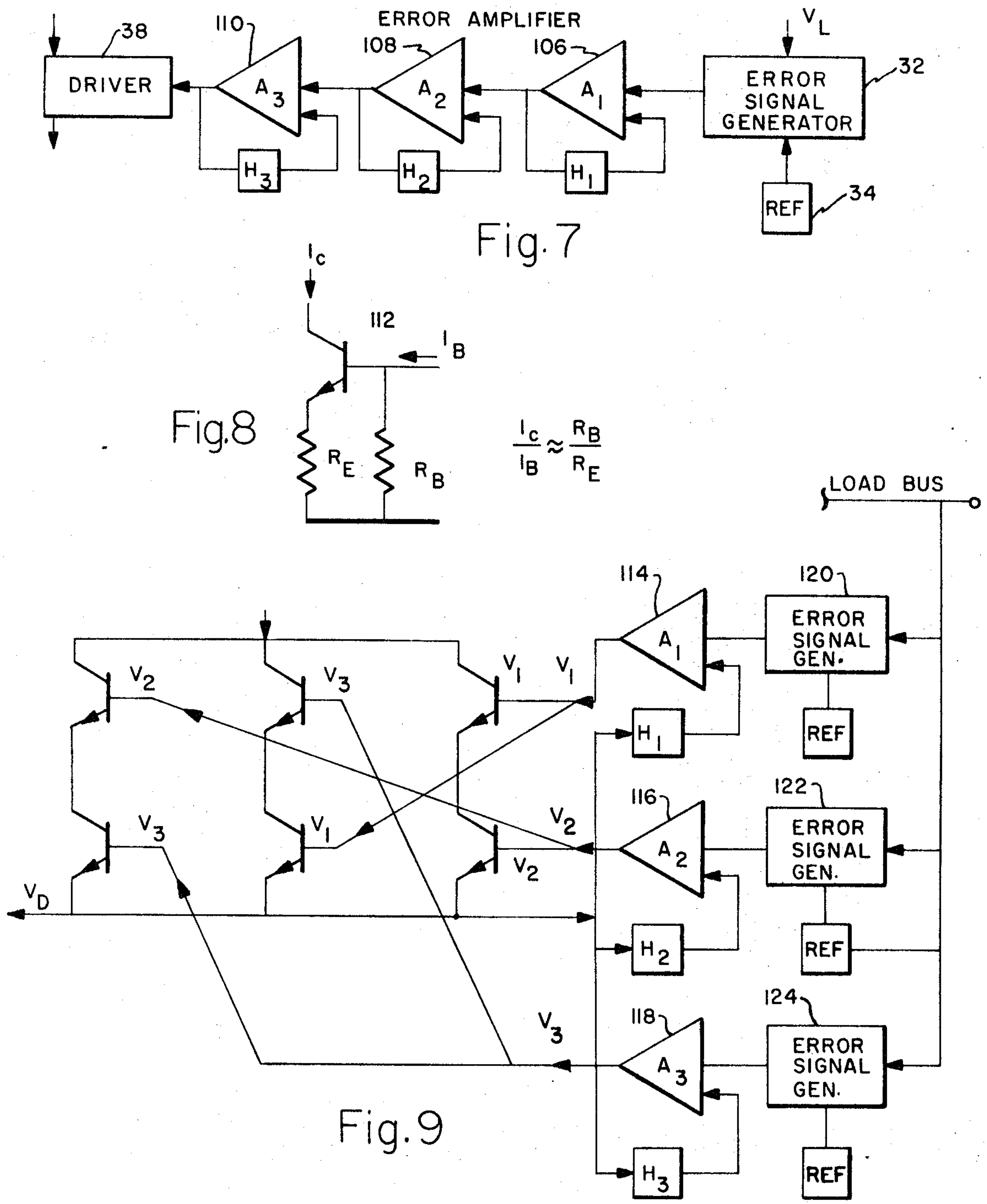
FIG. 7 is a detail block diagram of a portion of an example of the structure of FIG. 1.
FIG. 8 is a schematic diagram of an example of a typical detail of the apparatus shown in FIG. 1.
FIG. 9 is a schematic diagram of an example of a portion of a typical embodiment of the structure of FIG. 1.

An example of the error amplifier stability and reliability configuration of the invention is illustrated in FIG. 7. The error amplifier is seen to include three stages 106, 108, 110 coupled in a cascade relation between the error signal generator 32 and the driver network 38. When it is assumed that the gain $A_1$, $A_2$, $A_3$ of each stage could vary by, say, a factor of 2, then the overall amplifier variation could be a factor of 8. The minor loop feedback combination indicated, which includes a respective feedback proportion $H_1$, $H_2$, $H_3$ gain $= A_1'A_2'A_3'$ where $A_1'=A_1/(1=A_1H_1)$ and can be well approximated as $A_1'=1/H_1$ when $A_1H_1 \geqslant 1$. Accordingly the total gain variation can be realistically very small since the total gain $\approx 1/(H_1H_2H_3)$ and each of the feedback loops may consist of passive, drift free components.

Current amplifier stages may, as desired, similarly combine gain stabilization as shown in the illustration of FIG. 8. The current gain of the typical stage 112 is stabilized by combination of selected base and emitter resistors. The stabilizing selection may be made in a manner to satisfy the relation $I_C/I_B \approx R_B/R_E$ wherein $I_C$ and $I_B$ are collector and base current magnitudes, respectively, and $R_B$ and $R_E$ are the ohmic values of the base and emitter resistors, respectively.

Referring to FIG. 9 as Majority Voting AND Gate example of the 1is illustrated as a combination with three redundant amplifiers 114, 116, 118 each intrinsically stabilized as indicated and each fed by a separate, redundant error signal generator 120, 122, 124 and associated reference. Where the output signal of each error amplifier is $V_1$, $V_2$, $V_3$, respectively, they are coupled to the six element Majority Voting AND Gate amplifier as shown to provide the output error signal, to the driver, $V_D = (V_1 \cdot V_2) + (V_1 \cdot V_3) + (V_2 \cdot V_3)$ wherein the dot operator is defined as "and" and the plus operator is defined as "or." Accordingly, it is clear by inspection that $V_D$ is highly stable with respect to the "error" associated with the load bus irrespective of any failures in a reference, amplifier, feedback, or gate element.

There have thus been disclosed and described a number of examples and novel structural aspects of an electric power regulation system which achieves the objects and exhibits the advantages set forth hereinabove.

We claim:

1. A regulated electric power system comprising:
load and return bus means;
a plurality of electric energy generator elements connected between said load and return bus means in a power supplying relation thereto and being interconnected in a manner providing at least one power shunt tap point electrically spaced from each of said bus means, said plurality of electric energy generator elements being a matrix array of photovoltaic cells and said shunt tap point is electrically disposed within said array;
power dissipation means of the character to provide a controllable conductance and dissipation of excess energy supplied from said plurality of generator elements and being connected to said shunt tap points, said dissipation means being intercoupled between said shunt tap point and said return bus to shunt a portion of said generator elements which is significantly less than the whole, said power dissipation means including a quad failsafe network of power transistors;
dissipation driver means coupled to said power dissipation means controlling its conductance and dissipation and being connected to said generator elements in a power tapping relation for providing operating power to said driver means, said driver means being interconnected, in its operating power drawing relation, between the base electrodes of said power transistors of said power dissipation means and a driver tap point of said array electrically disposed between said power shunt tap point and said load bus, said driver tap point being electrically spaced significantly from said load bus;
electric parameter reference signal means;
error signal generator means coupled to said load bus and to reference signal means and being of the character to provide an error output signal representative of the difference between the values of the electric parameters existent at said load bus and the output terminal of said reference means; and
error signal means intercoupled between said error signal generator means and an input control terminal of said driver means for impressing controlling signals upon said driver means.

2. A regulated electric power system comprising:
load and return bus means;
a plurality of electric energy generator elements connected between said load and return bus means in a power supplying relation thereto and being interconnected in a manner providing at least one power shunt tap point electrically spaced from each of said bus means, said plurality of electric energy generator elements being a matrix array of photovoltaic cells and said shunt tap point is electrically disposed within said array;
power dissipation means of the character to provide a controllable conductance and dissipation of excess energy supplied from said plurality of generator elements and being connected to said shunt tap point, said dissipation means being intercoupled between said shunt tap point and said return bus to shunt a portion of said generator elements which is significantly less than the whole;
dissipation driver means coupled to said power dissipation means controlling its conductance and dissipation and being connected to said generator elements in a power tapping relation for providing operating power to said driver means, said driver means being interconnected, in its operating power drawing relation, between said power dissipation means and a driver tap point of said array electrically disposed between said power shunt tap point and said load bus, said driver tap point being electrically spaced significantly from said load bus;
electric parameter reference signal means;
error signal generator means coupled to said load bus and to reference signal means and being of the character to provide an error output signal representative of the difference between the values of the electric parameters existent at said load bus and the output terminal of said reference means; and
error signal means intercoupled between said error signal generator means and an input controlled terminal of said driver means for impressing controlling signals upon said driver means, said error signal means including a plurality of error signal amplifier stages each including minor loop feedback means, and majority vote failsafe logic intercoupled between said amplifier stage and said dissipation driver means.